D. LOCKE & J. N. BASHAW.
MARSH-SHOE.

No. 185,398. Patented Dec. 19, 1876.

Witnesses:
P. C. Dietrich
J. H. Duffy

Inventors:
Daniel Locke
John N. Bashaw
Per: C. H. Watson & Co. Attorneys.

UNITED STATES PATENT OFFICE.

DANIEL LOCKE AND JOHN N. BASHAW, OF GENEVA LAKE, WISCONSIN.

IMPROVEMENT IN MARSH-SHOES.

Specification forming part of Letters Patent No. 185,398, dated December 19, 1876; application filed October 6, 1876.

*To all whom it may concern:*

Be it known that we, DANIEL LOCKE and JOHN N. BASHAW, of Geneva Lake, in the county of Walworth and State of Wisconsin, have invented certain new and useful Improvements in Marsh-Shoe for Animals; and we do hereby declare that the following is a full, clear, and exact description thereof, which will enable others skilled in the art to which it appertains to make and use the same, reference being had to the accompanying drawings and to the letters of reference marked thereon, which form a part of this specification.

This invention relates to a supplemental shoe used upon animals while going over swampy or marshy ground, furnishing a broad bearing for the animal's foot, so that the animal will not sink or mire in the ground; and it consists in the combination of parts, whereby the said device may be readily attached and detached from the animal's foot, as will be hereinafter more fully set forth.

Figure 1:
Figure 2:
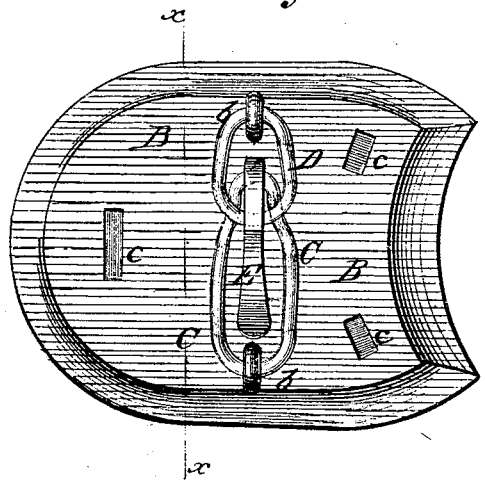
Figure 3:
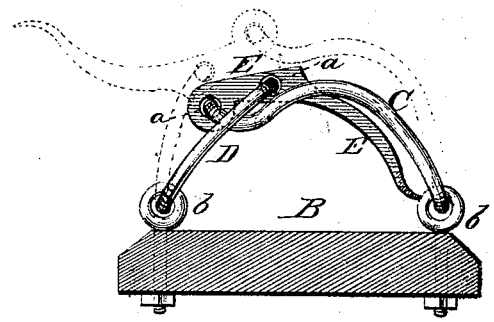

In the annexed drawing, Figure 1 represents a perspective, showing the position of parts when attached to the animal's foot. Fig. 2 is a plan view of the device, and Fig. 3 is a transverse section on line $x\ x$ of Fig. 2.

A represents the hoof of the animal, B the shoe, and C D E the fastening device. The fastening device consists of a long pivoted link, C, and a short pivoted link, D, the same being connected by lever E. Said lever is provided with two perforations, $a\ a$, through which the upper portions of each link pass, so that when the lever is thrown back or open the space between the shoe and the links and lever is sufficiently large to admit the hoof of the animal, as shown in dotted lines, Fig. 3.

When the lever is turned inward it draws the long link C down upon the hoof, and when the lever is pressed way down, as shown in Fig. 1, both links are made to firmly clasp the hoof, thus holding the supplemental shoe in position.

By means of the two perforations in the lever to receive the links, the lever, when turned down, becomes a self-locking device, requiring no other means to hold it in place. $b$ represents eyebolts, to which the links are pivoted.

The top of the supplemental shoe B is provided with depressions $c$ to receive the toe and heel calks of the animal's shoe, which prevents the supplemental shoe from slipping back and forth when secured in position.

By this means an efficient and durable supplemental shoe is provided, not liable to get out of repair, and easily manipulated.

Having thus fully described our invention, what we claim, and desire to secure by Letters Patent, is—

1. The supplemental shoe B, in combination with the pivoted links C D and the self-locking lever E, substantially as and for the purpose set forth.

2. The supplemental shoe B, provided with depressions $c$, eyebolts $b$, in combination with the links C D and self-locking lever E, substantially as and for the purpose set forth.

In testimony that we claim the foregoing as our own we affix our signatures in presence of two witnesses.

DANIEL LOCKE.
JOHN N. BASHAW.

Witnesses:
T. H. BULLICK,
W. MORRIS.